(12) United States Patent
Hünermann

(10) Patent No.: US 7,310,975 B2
(45) Date of Patent: Dec. 25, 2007

(54) METHOD AND DEVICE FOR PRODUCING A CYLINDRICAL BODY CONSISTING OF QUARTZ GLASS

(75) Inventor: Michael Hünermann, Alzenau (DE)

(73) Assignee: Heraeus Tenevo GmbH, Hanau (DE)

( * ) Notice: Subject to any disclaimer, the term of this patent is extended or adjusted under 35 U.S.C. 154(b) by 427 days.

(21) Appl. No.: 10/532,892

(22) PCT Filed: Oct. 27, 2003

(86) PCT No.: PCT/EP03/11916

§ 371 (c)(1),
(2), (4) Date: Apr. 27, 2005

(87) PCT Pub. No.: WO2004/039737

PCT Pub. Date: May 13, 2004

(65) Prior Publication Data

US 2006/0048546 A1    Mar. 9, 2006

(30) Foreign Application Priority Data

Nov. 1, 2002  (DE)  ............................... 102 51 390

(51) Int. Cl.
*C03B 37/018* (2006.01)
(52) U.S. Cl. .......................................... 65/421; 65/531
(58) Field of Classification Search ................ 65/421, 65/531; 427/163.2
See application file for complete search history.

(56) References Cited

U.S. PATENT DOCUMENTS 4,684,384 A    8/1987  Berkey 6,047,564 A    4/2000  Schaper et al.

FOREIGN PATENT DOCUMENTS

DE    196 28 958 A1    1/1998
JP    02 307839 A       12/1990

(Continued)

OTHER PUBLICATIONS

Patent Abstracts of Japan, vol. 016, No. 164, Apr. 21, 1992, for JP 04 012032 A (Jan. 16, 1992).
Patent Abstracts of Japan, vol. 015, No. 096, Mar. 7, 1991, for JP 02 307839 A (Dec. 21, 1990).

(Continued)

*Primary Examiner*—Steven P. Griffin
*Assistant Examiner*—Russell J Kemmerle
(74) *Attorney, Agent, or Firm*—Tiajoloff and Kelly

(57) ABSTRACT

A known method for producing a cylindrical body uses a precipitation assembly (5) consisting of several precipitators (4), to which a parent substance is fed via medium supply lines (9), whereby the precipitation assembly (5) completes a closed trajectory (6) according to a predetermined displacement course, said trajectory comprising at least one precipitation path (8) that runs along the longitudinal axis (2) of the support. The aim of the invention is to provide an economical, reproducible, failsafe method based on said known procedure, which enables in particular the production of soot layers (3) on a support (1) at a high precipitation rate and nevertheless a high degree of uniformity. To achieve this, the displacement course (6) comprises a first loop (7*a*, 8) and a second loop (7*b*, 8), whereby the completion of the first loop (7*a*, 8) causes a right-hand torsion in the medium supply lines (9) and the completion of the second loop (7*b*, 8) causes a left-hand torsion in said lines (9).

32 Claims, 3 Drawing Sheets

FOREIGN PATENT DOCUMENTS

Figure 1:
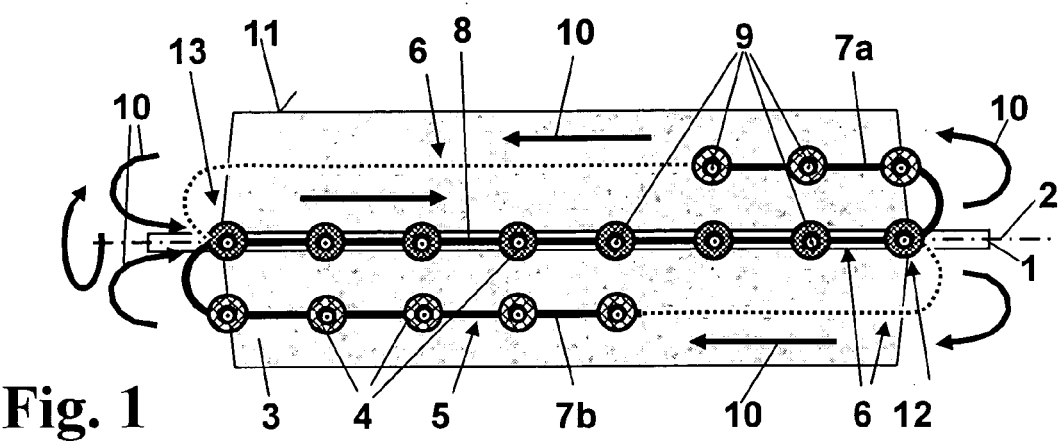

| | | |
|---|---|---|
| JP | 04 012032 A | 1/1992 |
| JP | 05 221670 A | 8/1993 |
| JP | 06 092669 A | 4/1994 |

OTHER PUBLICATIONS

Patent Abstracts of Japan, vol. 017, No. 674, Dec. 10, 1993, for JP 05 221670 A (Aug. 31, 1993).

Patent Abstracts of Japan, vol. 018, No. 357, Jul. 6, 1994, for JP 06 092669 A (Apr. 5, 1994).

METHOD AND DEVICE FOR PRODUCING A CYLINDRICAL BODY CONSISTING OF QUARTZ GLASS

The present invention relates to a method for producing a cylindrical body using a deposition assembly consisting of a plurality of series-arranged depositors to which a starting substance is fed via medium supply lines and by means of which particles are deposited in layers on the outer surface of a carrier rotating about its longitudinal axis to form the cylindrical body in that the deposition assembly travels through a closed path of movement in a predetermined movement sequence, the closed path of movement comprising at least one deposition path extending along the longitudinal axis of the carrier.

Furthermore, the present invention relates to a device which is used for producing a body and which is suited for carrying out the method according to the invention, the device comprising a deposition assembly consisting of a plurality of series-arranged depositors which are connected to medium supply lines for the supply of a starting substance, and which is movable over a closed path of movement which comprises at least one deposition path extending along a carrier which is rotatable about its longitudinal axis.

Cylindrical bodies obtained according to a method of the above-indicated type consist, for instance, of ceramics, metal, plastics, or glass, especially of doped or undoped quartz glass. Such quartz glass bodies are used as preforms for optical fibers, or they are e.g. used in rod or tube form as semifinished products or as start materials in optical fiber production, especially for optical quartz glass elements for use in microlithography or for producing equipment for the manufacture of semiconductors.

The production of synthetic quartz glass for said applications is often performed by flame hydrolysis of suitable silicon-containing start components, especially of silanes or siloxanes according to the known OVD method (outside vapor deposition). An intermediate product is here obtained in the form of a tubular "soot body" of porous quartz glass. For the production thereof the silicon-containing start components and fuels (media) are supplied to a deposition burner, they are hydrolyzed in a burner flame to obtain $SiO_2$ particles, and the particles are deposited in layers on a carrier rotating about its longitudinal axis, thereby forming the tubular $SiO_2$ soot body. A quartz glass tube is obtained from the tubular soot body by sintering, and a quartz glass rod is obtained by collapsing the inner bore.

For increasing the deposition rate ($SiO_2$ mass per time unit), several deposition burners may be combined in a row of burners, the row of burners being reciprocated in parallel with the soot body surface from one end of the developing blank to the opposite end. In this procedure, however, blank end portions are formed that terminate conically to the outside and have properties differing from those in the central portion, and they are therefore not usable. The length of said unusable end portions increases with the length of the burner row.

For solving this problem, it is suggested in DE 196 28 958 A1 that a burner assembly should be used, consisting of a plurality of deposition burners which are arranged in a row, and that the burner assembly should be reciprocated in an oscillating manner along the carrier rotating about its longitudinal axis, each deposition burner only sweeping over a small portion of the surface of the soot body. Although soot bodies with end portions tapering to the outside are produced, the size of the end portions does not depend on the length of the burner assembly, but on the amplitude of the reciprocating movement. It is thereby possible to use an elongated burner row with a plurality of deposition burners and at a correspondingly high deposition rate per time unit. However, inhomogeneities are observed in the regions of the reversal points of the burner movement due to local changes in the temperature, due to mass deposition or due to density. Moreover, differences in the deposition characteristics of different deposition burners have locally different effects on surface temperature and mass deposition, whereby inhomogeneities are also caused.

These may lead to an irregular surface and may be noticed in a disadvantageous way in the further processing of the soot body and thus diminish the quality of the quartz glass cylinder obtained from the soot body, or they require a troublesome reworking. Although this technique is characterized by a high deposition rate, the quartz glass cylinders obtained thereby can, without a reworking process, only be used for producing quartz glass where relatively low demands are made on homogeneity.

These drawbacks are prevented in the generic method according to U.S. Pat. No. 4,684,384 A, which also discloses a device with the above-mentioned features. The simultaneous production of several $SiO_2$ blanks from porous quartz glass in a single facility is described therein. To this end a plurality of deposition burners are provided that, circulating one after the other around a closed, substantially circular loop (trajectory), deposit $SiO_2$ particles on the carriers which are arranged around the trajectory and are rotating about their longitudinal axis. The respective blank ends are obtained in this method by the measure that all deposition burners pivot away one after the other during their circulation around the trajectory from the respective carrier to be moved towards the next carrier. The deposition burners do not change their direction of movement in this process, so that all of the deposition burners travel through the same trajectory positions time and again.

This procedure in which it is possible to use an arbitrarily long burner row is characterized by a high deposition rate together with a simultaneously high homogeneity of the soot body and the resulting quartz glass cylinder. Nevertheless, this known method has not been accepted in practice. The main reason for this must be seen in the fact that the repeating circular movement of the deposition burners requires complicated measures for preventing a longitudinal torsion of the medium supply lines and a twisting among the same. Two measures are recommended for this in U.S. Pat. No. 4,684,384 A. On the one hand, a reciprocating movement of the burner row with the above-discussed drawbacks. And on the other hand the use of a rotary leadthrough to the supply line of the medium flows into the deposition chamber. The rotary leadthrough which consists essentially of metallic components and of sealing components is very complicated constructionally and might satisfy the standard process demands made on purity, operational reliability and reproducibility only to a limited degree because of the chemical aggressiveness of the media used (such as $SiCl_4$).

It is therefore the object of the present invention to provide an economic, reproducible and operationally reliable method for producing cylindrical bodies, especially for producing soot layers of $SiO_2$ on a carrier at a high deposition rate and of high homogeneity at the same time.

Moreover, it is the object of the present invention to provide a constructionally simple and inexpensive device which is also suited for carrying out the method of the invention.

As for the method, this object starting from the above-indicated method is achieved according to the invention in that the path of movement comprises a first loop and a second loop, the travel through the first loop causing a right-hand twisting of the medium supply lines, and the travel through the second loop causing a left-hand twisting of the medium supply lines.

Without a reversal of the direction of movement, the deposition assembly repeatedly travels through a closed path of movement along which one or several carriers are arranged for forming one or several bodies. The track of the path of movement along which the depositors cause a deposition of particles on the carrier shall here and in the following also be designated as a "deposition path".

In contrast to the known method, both a reversal of the depositor movement and a rotary leadthrough for the medium supply can be omitted in the method of the invention. Instead of this, a slight twisting of the medium supply lines among each other is accepted, but a shearing or tearing off of the lines is prevented in that the deposition assembly in its movement sequence travels through at least two loops having an opposite action on the twisting of the medium supply lines, i.e., at least one first loop that causes a right-hand twisting of the medium supply lines and at least one second loop in which the medium supply lines are subjected to a left-hand twisting. Right-hand twisting and left-hand twisting compensate each other in the simplest case after each travel through the whole path of movement. If after a single travel through the path of movement a residual twisting remains in one direction, its compensation or overcompensation is carried out through excessive twisting in the opposite direction during later travel through the path of movement. A method accepting a constantly increasing twisting of the medium supply lines in one direction without offering the possibility of untwisting by twisting in the opposite direction is not the subject of the present invention.

The closed path of movement is defined by the start point of the burner movement and the subsequent path for returning the deposition assembly to the start point. For completing a movement sequence within the meaning of the present invention, comprising at least one travel through a first loop with a right-hand twisting and at least one travel through a second loop with a left-hand twisting, the deposition assembly travels through the path of movement once or repeatedly. It is essential that in each movement sequence at least a section of the path of movement is configured as a deposition path, and that the deposition assembly travels through at least one loop with a right-hand twisting of the medium supply lines and at least one loop with a left-hand twisting of the medium supply lines. The medium supply lines are made so flexible that they can still absorb the necessary degree of twisting and torsion. Torsion of the individual medium supply lines can also be counteracted by an axially rotatable support of the deposition burners, so that the torsion of the individual medium supply lines will no longer be considered in the following.

The deposition assembly consists of several depositors arranged side by side. The length of the deposition assembly and the number of its depositors depend on the length of the path of movement and the length of the at least one deposition path. A deposition assembly may be used that is shorter than the length of the cylindrical body to be produced, but the deposition assembly is preferably longer than the body, as will become apparent from the following explanations. At any rate, due to the use of a deposition assembly comprising several depositors, a high overall rate of deposition (per time unit) is achieved. Moreover, the deposition assembly is always moved from one front end of the developing body to the opposite front end, so that reversal points of the depositor movement impressed onto the body surface cannot be observed and axially homogeneous material characteristics and a planar surface are thereby achieved. Differences between the depositors do not cause any axial inhomogeneities with respect to density and mass deposition. Moreover, a reversal of the direction of movement and the accompanying drawback as to the formation of tapering body ends are also avoided. The method of the invention therefore permits a high deposition rate together with an axially homogeneous distribution of the material characteristics of the body and an exact cylinder geometry without any significant surface undulation.

The method according to the invention is suited for producing cylindrical bodies consisting of different materials, particularly of $SiO_2$. The depositors are e.g. configured as flame hydrolysis burners or plasma burners for forming and subsequently depositing particles of the material on the carrier, as burners for flame and plasma spraying or as atomization nozzles or injectors for applying layers of powders of the respective material on a carrier. The particles to be deposited on the carrier are supplied in the depositor or are formed in the depositor.

If the material is quartz glass, a tubular $SiO_2$ soot body is produced according to the method, and a quartz glass tube can be obtained from said body by way of sintering, and a quartz glass rod by collapsing the inner bore thereof. The carrier is normally removed before sintering or collapsing; otherwise, the soot body is collapsed onto the carrier during sintering. The carrier is a rod-shaped or tubular body of graphite, of a ceramic material such as aluminum oxide, of undoped quartz glass, of doped quartz glass or of doped or undoped porous $SiO_2$ soot. Carriers consisting of doped quartz glass or doped $SiO_2$ soot may here also have a radially inhomogeneous dopant distribution and may particularly be configured as semifinished products for optical fibers as a so-called "core rod" with a radially inhomogeneous refractive index profile. A particularly preferred variant of the method according to the invention is characterized in that neighboring depositors of the deposition assembly keep a desired distance ranging from 5 cm to 50 cm from one another, and that during travel through the deposition path the first depositor of the deposition assembly follows the last depositor at a distance within the range of the desired distance.

The desired distance of the depositors from one another is within the usual range between 5 cm and 50 cm, but a constant depositor-to-depositor distance is not required in the deposition assembly. It is essential that in the movement sequence along the deposition path the first depositor of the deposition assembly always follows the last depositor at a similar distance as said desired distance. This can ensure a continuous deposition process on the carrier and prevent an excessive cooling of the body surface, which has an advantageous effect on the homogeneity of the deposition process and permits a constant axial mass deposition and a homogeneous density distribution. This deposition process, which is as continuous as possible, shall also be designated in the following as a "uniform frequentation" of the deposition path. The first depositor of the deposition assembly need here not follow the last depositor on the same deposition path. What is of importance is just the axial distance among the depositors, for the same effect is achieved due to the rotation of the carrier about its longitudinal axis when the first depositor of the deposition assembly follows the last depositor on a deposition path extending in parallel therewith.

It has turned out to be advantageous when particles formed by the depositors outside the deposition path are collected by means of a collection device. The collected particles can be removed from the deposition chamber so that particles straying therein, which may lead to inhomogeneities upon impingement on the developing body, are reduced.

In a first preferred alternative of the method according to the invention, the first loop is traveled through in a predetermined direction of rotation, and the second loop in the opposite direction of rotation.

In this case the path of movement comprises at least a first loop and a second loop, each being traveled through in the respectively opposite direction of rotation. The designations "first loop" and "second loop" as are here chosen do not indicate the sequence in which said loops are traveled through by the deposition assembly. In the simplest case the depositors move once around the left side and once around the right side (or vice versa), so that the medium supply lines in each movement sequence are first twisted by 360 degrees and are untwisted again accordingly when traveling through the subsequent loop. The path of movement may also comprise more than two loops. It is important that the twists caused during travel through the loops can be completely compensated again in the same or in a later movement sequence.

There are several variants suited for the arrangement of the loops within the path of movement. In a first variant, the first loop and the second loop have a joint deposition path. This embodiment of the path of movement shall also be designated in the following as a "double loop".

In this case the deposition path forms a section shared by the two loops along the path of movement. At the end of the joint section the path of movement branches off by "switching" into a right-hand winding pertaining to the first loop or into a left-hand winding pertaining to the second loop. The two loops may also have several deposition paths in common. In this method a kind of "switch" is needed, but a crossing point between the loops can be avoided, which point requires a corresponding mechanical adaptation of the path of movement and which particularly in the case of long deposition assemblies may entail problems because of the fact that the medium supply lines present mutual obstacles to one another. It has also turned out to be advantageous that the deposition assembly always travels through the joint path of movement in the same direction of movement, which is conducive to its uniform frequentation and thus improves the homogeneity of the soot body.

In a second suitable variant for the arrangement of the loops inside the path of movement, each of the two loops has a deposition path and they share a crossing point. In this variant, the two loops also differ from each other in their direction of rotation. At the crossing point the first loop and the second loop intersect, and it is not necessary here that the loops at the crossing point extend in a joint plane. At any rate the crossing point is obtained in the projection of the path of movement onto a plane extending in parallel with the longitudinal axis of the carrier. An overlapping of the loops offers many possible variants of design for a closed path of movement within the meaning of the invention. The two loops with the opposite direction of rotation form an "8-form" in the simplest case, so that said embodiment of the path of movement will also be designated in the following as an "8-shaped loop".

Preference is given to a variant of the method of the invention in which the depositors are operated in a deposition mode with deposition of particles on the outer cylinder surface of the carrier during travel through the deposition path, and in an idle mode without deposition of particles.

Thanks to a switching between deposition mode and idle mode, start material and possibly also fuels can be saved. To this end the supply of said media or at least of the start material is stopped or reduced when the depositors are outside a deposition path.

In the case of a "double loop", not more than 50% of the depositors of the deposition assembly are advantageously operated in the deposition mode at the same time.

The deposition assembly is here at least twice as long as the partial length of the deposition assembly with depositors being each operated in the deposition mode. This helps to homogenize the deposition process on the carrier and thus to observe an approximately identical temperature of the body surface in the case of heating depositors. This requires that another depositor will be used at the rear end as soon as the first depositor of the deposition assembly leaves the joint deposition path at the front end to be returned via the one loop towards the rear end. Since the return path to the rear end in a cylindrical body cannot be shorter than the deposition path itself, the deposition assembly must have at least twice the length of the deposition path.

In the described first alternative of the method of the invention, the right-hand twisting and the left-hand twisting of the medium supply lines is accomplished through correspondingly wound loops of the of movement in that the deposition assembly changes its direction (sense) of rotation. In the second preferred alternative of the method of the invention, which will be explained in the following, the first loop causing the right-hand twisting and the second loop of the closed path of movement that causes the left-hand twisting are formed by a suitable dynamic supply of the medium supply lines.

The path of movement comprises a single loop which is traveled through by the deposition assembly at least once as the first loop and at least once as the second loop in the same direction of rotation, the medium supply lines or o medium collection line branched into the medium supply lines being shifted in the movement sequence such that when the first loop is traveled through a right-hand twisting is obtained and when the second loop is traveled through a left-hand twisting of the medium supply lines or the medium collection line is obtained.

The medium supply lines or a medium collection line branching into the medium supply lines are here shifted during a movement sequence such that a left-hand twisting and a right-hand twisting of the medium supply lines or the medium collection line are alternatingly obtained.

When the deposition assembly travels through a wound section of the path of movement (loop), the direction of twisting of the medium supply lines depends on the side from which medium supply lines or medium collection line are fed to the depositors. In one case this yields a left-hand twisting of the medium supply lines among one another, and in the other case a right-hand twisting. This effect is exploited in the method of the invention for preventing excessive twisting of the medium supply lines in that the medium supply lines or the medium collection line are fed to the depositors during a movement sequence, arriving at least once from the one side of the path of movement (from above) and at least once from the opposite side of the path of movement (from below). In this procedure the medium supply lines or the medium collection line must therefore be shiftable from the one side of the path of movement to the other side. A track, which is otherwise closed, is here passed through by the medium supply lines or the medium collection line in a direction transverse to the track course. In this variant of the method, a simple closed single loop is adequate; a double loop or an 8-shaped loop is not needed.

In each movement sequence, the single loop is passed through at least twice, namely once as the first loop with right-hand twisting and once as the second loop with left-hand twisting of the medium supply lines or the medium collection line. This procedure will be illustrated in the following with reference to a simple example: When the depositors travel anticlockwise through a closed single loop forming a horizontal plane and when in this case the medium supply lines are fed from underneath the horizontal plane to the depositors, this yields a twisting of the lines in one direction. Otherwise, upon supply of the medium supply lines from above the horizontal plane and through the path of movement, this yields a twisting in the other direction. The medium supply lines are e.g. shifted according to predetermined time intervals, in dependence upon the position of the deposition assembly on the path of movement, after a non-recurring travel or after repeated travels through the path of movement, if necessary, or statistically. A previously produced twisting of the medium supply lines is compensated or overcompensated completely or in part after the shifting thereof.

Said shifting of the medium supply lines is particularly simple when the individual medium supply lines are bundled into a medium collection line which branches at a branch point into the medium supply lines connected to the depositors.

For changing the twisting direction of the individual medium supply lines connected to the depositors, the medium collection line must just be shifted such that it is supplied once from the one side to the path of movement and once from the other side. The medium collection line is e.g. configured as a bundle of the individual medium supply lines and in this case the medium supply lines are just distributed at the branch point, or the medium collection line contains a single line for each of the media to be supplied to the depositors (starting substances, fuels). In this case a container from which the individual medium supply lines branch off is provided at the branch point. The branch point is preferably positioned near the plane of the path of movement; a shifting of said branch point is however not required for causing a right-hand or a left-hand twisting of the medium supply lines or the medium collection line. What is essential for the direction of twisting after shifting is the course of the lines directly in front of the depositors.

It has turned out to be particularly useful when the shifting of the medium supply lines or the shifting of the medium collection line comprises a passing through the path of movement.

During shifting the path of movement is traversed by the individual medium supply lines or by the medium collection line, the path of movement comprising a suitable passage for this purpose, for instance in the form of a permanent or closable gap. After passage of the medium supply lines or the medium collection line a reversal of the former twisting direction is achieved for said lines.

Preferably, the single loop is completely occupied by the depositors of the deposition assembly in this variant.

The complete occupation with depositors permits a continuous deposition without interruption by gaps in the deposition assembly and thus a homogeneous temperature action on the body or bodies when heating depositors are used, such as deposition burners in the form of plasma burners or flame hydrolysis burners. This procedure has a particularly advantageous effect whenever several carriers on which material particles are deposited are arranged one after the other along the path of movement.

In the simplest case the medium supply lines or the medium collection line is each time shifted once during travel through the path of movement.

The path of movement is here traveled through fully or alternatingly in the case of medium supply lines arriving from the one side and in the case of medium supply lines arriving from the other side. The medium supply lines or the medium collection line may here traverse the above-mentioned permanent or temporarily existing gap of the path of movement before or after the deposition assembly passes through said gap.

The method can be performed in a particularly simple way when the medium supply lines or the medium collection line are shifted alternatingly after having passed once through the first loop and the second loop.

It has turned out to be advantageous when before each passage through the path of movement the medium supply lines have a preliminary twisting with a twisting direction opposite to the twisting direction in the subsequent passage through the path of movement.

Hence, during each passage through the path of movement a previously existing twisting is overcompensated in the opposite direction. Ideally, the twisting of the medium supply lines can thus be limited to 180 degrees in the one and in the other direction.

The two above-described alternatives of the method are further improved if at least two carriers rotating about their respective longitudinal axis are provided along the path of movement, the path of movement comprising at least one deposition path extending along each carrier.

Starting from the deposition path that is the first one, the deposition assembly can here be returned at the beginning of the first deposition path via a further second deposition path. This prevents an idle operation of the depositors and increases the overall deposition rate.

It has turned out to be advantageous when the at least two carriers comprise longitudinal axes extending in parallel with one another.

The parallel arrangement of the carriers yields a short length of the path of movement. This is particularly true for the use of two carriers whereas in the case of three or more carriers polygonal arrangements may also be of advantage.

In the alternative of the method with a shifting of the medium supply lines, a further improvement is achieved when each of the depositors has assigned thereto a main deposition direction which extends inclined by not more than 30 degrees relative to a plane formed by the carriers.

With a corresponding orientation of the depositors in said plane, a heating up of the medium supply lines (or the collection line) can be diminished during their shifting in the case of heating depositors.

Moreover, two deposition paths that are opposite to the each other on the path of movement and are interconnected through 180-degree arcs with a small radius can thereby be realized. Small 180-degree arcs ensure a minimum idle running of the depositors or a low loss of start material. In the simplest case two carriers arranged along a path of movement form a horizontally oriented plane of the path of movement. The main deposition direction extends in this case also horizontally, or it extends upwards slightly inclined with an inclination angle of not more than 30 degrees relative to the horizontal. In the case of depositors in the form of deposition burners the main propagation direction corresponds to the main propagation direction of the respective burner flame.

As for the device, the above-indicated object starting from a device of the above-indicated type is achieved according to the invention in that the path of movement comprises a first loop causing a right-hand twisting of the medium supply lines, and a second loop causing a left-hand twisting of the medium supply lines.

Without a reversal of the direction of movement the deposition assembly passes repeatedly through a closed path of movement along which one or several carriers are arranged for forming a deposition body or several cylindrical deposition bodies.

In contrast to the known device, a rotary leadthrough for the supply of the starting substances is omitted in the device of the invention. Instead of this, a slight twisting of the medium supply lines among one another is accepted, but a shearing or tearing off of the lines is prevented in that the deposition assembly in its movement sequence passes through at least two loops having an opposite effect on the twisting of the medium supply lines, namely at least one first loop causing a right-hand twisting of the medium supply lines and at least one further second loop in which the medium supply lines are subjected to a left-hand twisting. In the simplest case, right-hand twisting and left-hand twisting completely offset one another during each passage through the path of movement. If a residual twisting remains in one direction after a non-recurring travel through the path of movement, a compensation or overcompensation thereof is effected by an excessive opposite twisting in the subsequent travel through the path of movement.

The closed path of movement is defined by the start point of the burner movement and the subsequent path for returning the deposition assembly to the start point. For completing a movement sequence in the sense of the invention the deposition assembly travels through the path of movement once or repeatedly. It is essential that in each movement sequence at least one section of the path of movement is configured as the deposition path and that the deposition assembly passes through at least one loop with right-hand twisting of the medium supply lines and at least one loop with left-hand twisting of the medium supply lines. The medium supply lines are configured to be so flexible that they can absorb the required degree of twisting and torsion. The torsion of the individual medium supply lines can also be counteracted by an axially rotatable support of the depositors, so that the torsion of the individual medium supply lines will no longer be considered in the following.

The deposition assembly consists of several depositors arranged side by side. These are e.g. flame hydrolysis burners or plasma burners for the formation and subsequent deposition of particles of the material on the carrier, or burners for flame and plasma spraying or atomization nozzles or injectors for applying layers of powders of the respective material on the carrier.

The length of the deposition assembly and the number of its depositors depends on the length of the path of movement and the length of the at least one deposition path. A deposition assembly may be used that is shorter than the length of the body to be produced, but preferably the deposition assembly is longer than the body. In each case a high overall rate of deposition (per time unit) is achieved due to the use of a deposition assembly comprising several depositors. Moreover, the deposition assembly is always moved from a front end of the developing body to the opposite front end, so that reversal points of the depositor movement impressed onto the body surface do not occur, and axially homogeneous material properties and a planar surface are thus achieved. Moreover, a reversal of the direction of movement and the accompanying drawback with respect to the formation of tapering body ends are thereby avoided as well. Therefore, the device according to the invention permits a high deposition rate together with an axially homogeneous mass deposition and a homogeneous distribution of the material characteristics of the deposition body and thus an accompanying exact cylinder geometry without any significant surface undulation; the drawbacks resulting from a rotary leadthrough with respect to constructional expense and poor operational reliability and reproducibility are thereby avoided.

Further advantageous developments of the device of the invention become apparent from the subclaims. Insofar as configurations of the device indicated in the subclaims imitate the procedures mentioned in subclaims regarding the method of the invention, reference is made for supplementary explanation to the above observations made on the corresponding method claims.

Further advantageous modifications of the device of the invention shall now be explained:

Advantageously, in the case of a device having at least one first loop and at least one second loop, the first loop and the second loop have the same length.

This guarantees that the residence time of the deposition assembly in each of the loops is the same, so that a uniform frequentation of the deposition path or the deposition paths by the deposition assembly is made possible. This is promoted when the loops have the same lengths or when the length of the deposition assembly is adjusted according to the loop length, reduced by a depositor-to-depositor distance.

For carrying out the above-described variant of the method with shifting of the medium supply lines during the movement sequence, one embodiment of the device according to the invention has turned out to be useful in which the path of movement comprises a closed single loop which is traveled through by the burner assembly at least once as the first loop and in the same direction of rotation at least once as the second loop, and that a means is provided for shifting the medium supply lines or a medium collection line branching into the medium supply lines, in such a manner that the medium supply lines or the medium collection line extend to the depositors during a movement sequence, alternatingly arriving from one side of the closed single loop and from the opposite side of the single loop.

Depending on whether the medium supply lines or the medium collection line extend from the one side or from the opposite side of the path of movement to the depositors, this will once yield a left-hand twisting and once a right-hand twisting. Reference is made to the above explanations regarding the method according to the invention.

A particularly preferred design of the device of the invention with at least two carriers having longitudinal axes extending in parallel with each other is characterized in that the distance of the longitudinal axes of the carriers can be enlarged.

It is thereby possible to keep constant the distance between the depositors and the surface of the deposition bodies which are formed on the carriers and get larger.

Stationary additional heaters in the region of the body ends accomplish a consolidation of particularly porous ends, which improves the mechanical stability of the deposition body.

One embodiment of the device according to the invention has turned out to be particularly advantageous, wherein the depositors have each a central axis, the depositors being each rotatably supported about the central axis in a mount connected to the path of movement.

Thanks to the rotatable supporting of the depositors the torsion of the individual medium supply lines relative to the depositors is reduced during travel through the path of movement.

Figure 2:
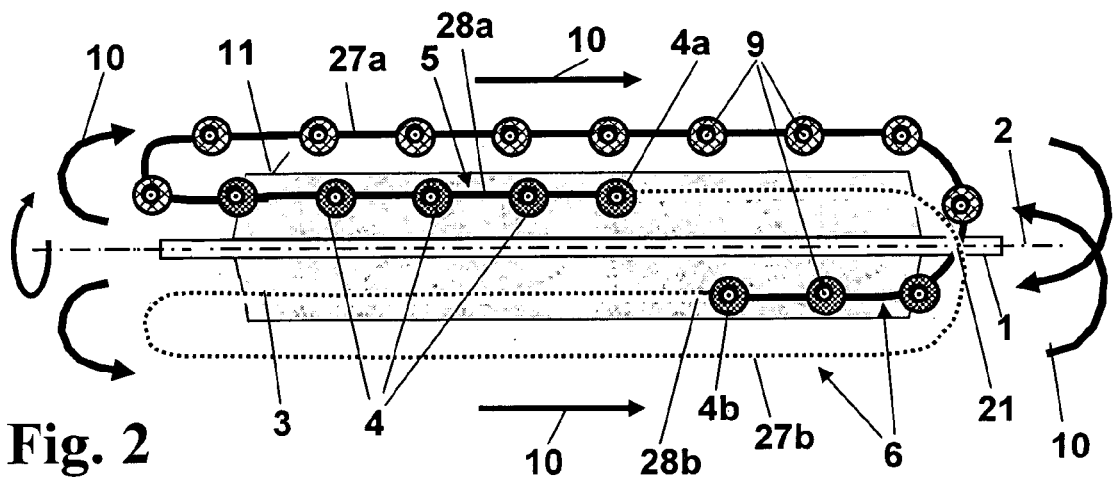
Figure 3:
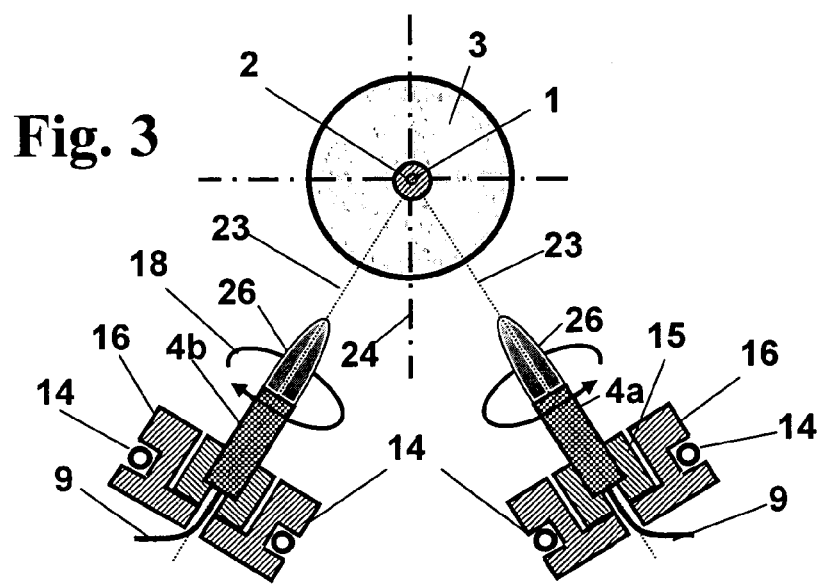
Figure 4:
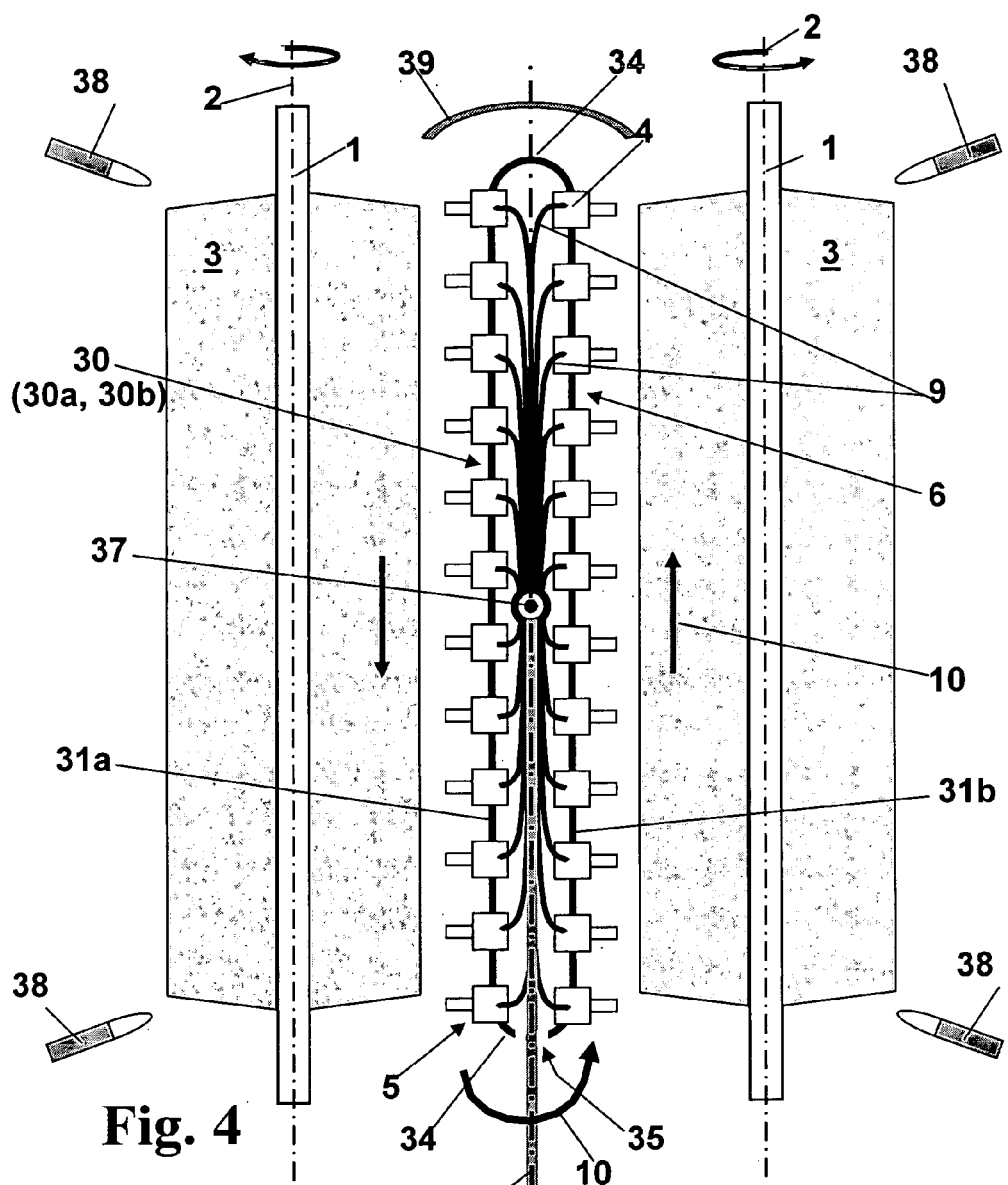
Figure 5:
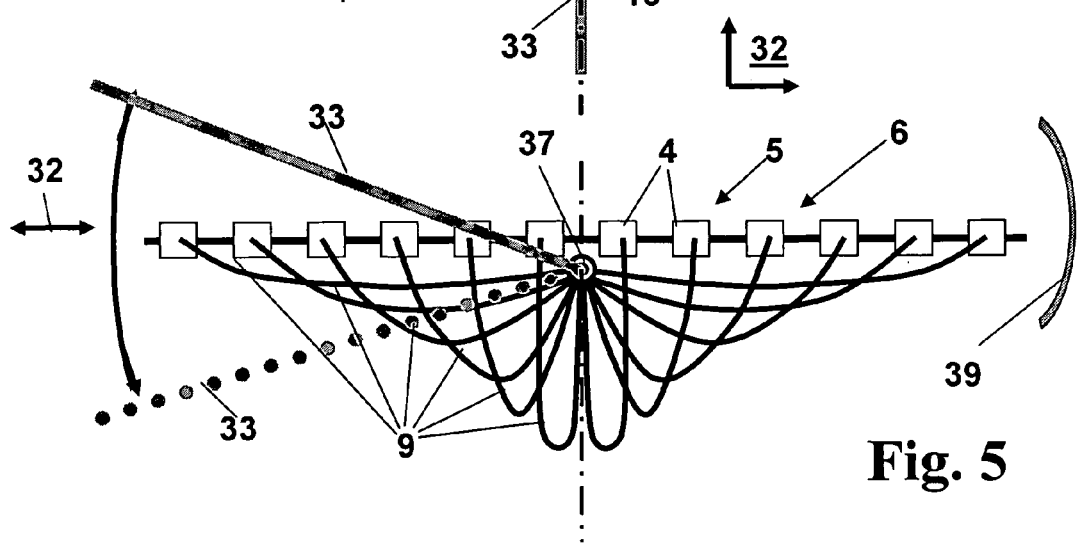

The invention shall now be explained in more detail with reference to embodiments and a drawing which schematically shows in detail in FIG. 1 a device for carrying out the method of the invention, including a path of movement in the form of a double loop with a joint path of deposition, in a view from below onto the carrier;

FIG. 2 a second variant of the device including a path of movement in the form of an 8-shaped loop and with two deposition paths, in a view from below onto the carrier;

FIG. 3 a variant of the device according to FIG. 2, in a view onto the front side of the longitudinal axis of the carrier;

FIG. 4 a further variant of the device with a path of movement in the form of a single loop and medium supply lines which can be displaced around a plane of the path of movement, in a top view;

FIG. 5 the variant of FIG. 4 in a side view; and

Figure 6:
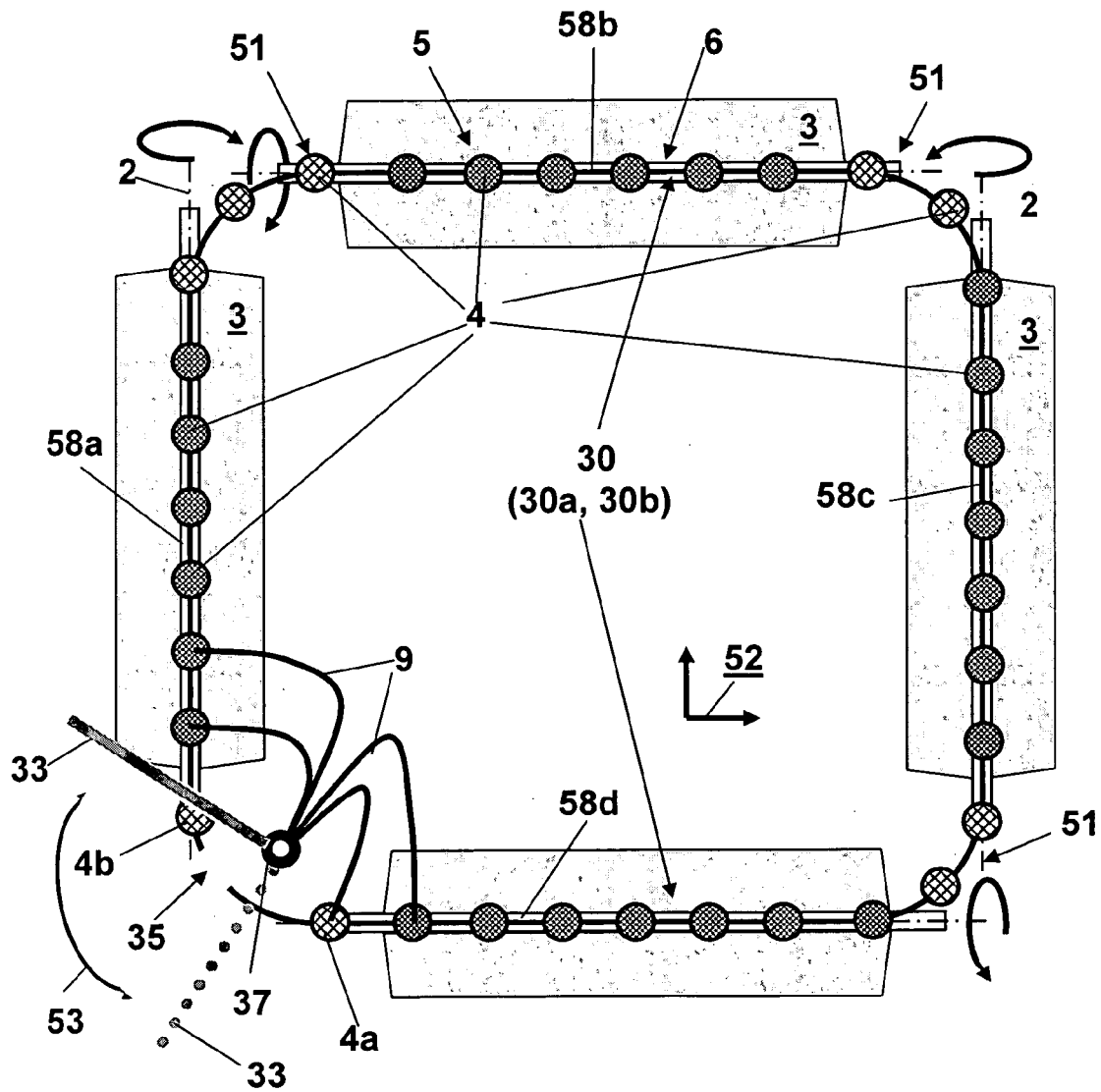

FIG. 6 a further variant of the device with a path of movement in the form of a closed single loop with left-hand and right-hand windings about four carriers arranged in a square, and with medium supply lines which can be displaced around the plane of the path of movement, in a top view.

The arrangement according to FIG. 1 shows a carrier 1 in the form of an aluminum oxide tube which rotates about its longitudinal axis 2, as outlined by the rotational arrows. A porous soot body 3 is formed by means of an OVD method (outside vapor deposition) on the carrier 1. To this end a total of 16 deposition burners 4 of quartz glass, depositors within the meaning of the present invention, are provided that are displaced in a row at a distance of 15 cm each in the form of a "burner coil" 5 along a path of movement 6 with a total length of 4.80 m. The path of movement 6 is configured as a rail, as will be explained in detail with reference to FIG. 3. The individual deposition burners 4 of the burner coil 5 are interconnected by means of a chain. The path of movement 6 has the shape of a double loop, the two loop sections 7a, 7b having the same length and a joint central section 8 that extends in parallel with the longitudinal axis 2 of the carrier. The length of the burner coil 5 is 2.25 m, which is half the length of the path of movement 6 less a burner-to-burner distance of 15 cm, and thus about twice the length of the central section 8. The burner coil 5 is represented by a continuous bold line, and the part of the path of movement 6 that is presently not occupied by deposition burners 4 by a thin dotted line. The path of movement 6 is configured in the form of a guide rail for the burner coil 5.

$SiCl_4$, hydrogen and oxygen are supplied to each of the deposition burners 4 via separate medium supply lines 9. The medium supply lines 9 arriving from below extend in the view of FIG. 1 in a direction perpendicular to the sheet plane. They are made from flexible tubes of PFA (perfluoroalkoxy) or from polytetrafluoroethylene (Teflon). Both materials have turned out to be suitable materials for the formation of the medium supply lines for reasons of purity and resistance to chemicals and because of thermal stability.

The method of the invention shall now be explained in more detail with reference to an example and with reference to FIG. 1:

For producing an $SiO_2$ soot body 3 the deposition burners 4 are fed in nominal terms via separate medium supply lines 9 with the same amounts of the media in the form of $SiCl_4$, oxygen and hydrogen, and each of these amounts is converted in a burner flame (whose direction of propagation in the illustration of FIG. 1 extends in a direction perpendicular to the sheet plane towards the soot body 3) into $SiO_2$ particles. When traveling through the central section 8, the burner flames are directed onto the carrier 1 or the surface 11 of the soot body 3 already formed thereon, so that $SiO_2$ particles are deposited in layers by means of the deposition burners 4 onto the carrier 1 with formation of the porous $SiO_2$ soot body 3. In this respect the central section 8 is a "path of deposition" within the meaning of the invention. During travel through the loop sections 7a, 7b the $SiCl_4$ supply to the deposition burners 4 is stopped.

The burner coil 5 is moved in a repeating movement sequence without reversal of the direction of movement along the path of movement 6. The movement sequence is sketched by the directional arrows 10. The central section 8 of the path of movement 6 is traveled through by the burner coil 5 in the illustration of FIG. 1 always from the left to the right side, and it is only in the central section 8 that $SiO_2$ particles are deposited on the outer cylindrical surface 11 of the soot body 3. At the right end 12 of the central section 8, the path of movement 6 branches once into the loop section 7a wound to the left side and during the next travel into the loop section 7b wound to the right side. In the embodiment, the following movement sequence is obtained: The burner coil 5 travels through the central section 8 from the start point 13 (left end of the central section 8) to the end 12 (right end of the central section 8) and first terminates there in the loop section 7a wound to the left side, through which the burner boil 5 is returned again to the start point 13. So far this has led to a left-hand twisting of the medium supply lines 9 by 360 degrees. The last deposition burner 4 of the burner coil 5 is provided with an arm which activates a switch. After having traveled through the central section 8 again, the burner coil 5 therefore terminates in the loop section 7b which is wound to the right side and through which it is returned again to the start point 13 where the next movement sequence will start. During travel through the loop section 7b the left-hand twisting of the medium supply lines 9 is fully compensated, so that at the end of each movement sequence the medium supply lines 9 are untwisted. The length of the burner coil 5 is chosen such that the foremost deposition burner 4 starts at a distance of about 15 cm from the last deposition burner 4 of the burner coil 5 at the start point 13 in the middle section 8.

This permits a continuous movement sequence of the burner coil 5 without reversal of the direction of movement and without cooling of the soot body 3, the medium supply lines 9 being twisted by 360 degrees at the most. With a preliminary twisting of the medium supply lines by e.g. 180 degrees to the right, the initial left-hand twisting can be halved during travel through loop section 7a, and thus also the maximum twisting on the whole.

The method according to the invention permits a homogeneous deposition of the $SiO_2$ particles at a high deposition rate, and constructionally complicated rotary leadthroughs for the medium supply can be omitted.

If the same reference numerals as in FIG. 1 are used in FIGS. 2 to 6, these designate identical or equivalent parts of the device as the corresponding reference numerals in FIG. 1. Detailed explanations follow from the above observations.

In the device shown in FIG. 2, a carrier 1 is shaped in the form of an aluminum oxide tube which rotates about its longitudinal axis 2. A porous soot body 3 is formed by means of an OVD method (outside vapor deposition) on carrier 1. To this end a total of 18 deposition burners 4 of quartz glass are provided and displaced in a row at a distance of 10 cm each in the form of a "burner coil" 5 along a path of movement 6. The path of movement 6 has the form of an 8-shaped loop, consisting of the two loop sections 27a, 27b that intersect at a crossing point 21. The two loop sections 27a and 27b have the same length. Each has a deposition path 28a, 28b which extends in parallel with the longitudinal axis 2 of the carrier. The length of the burner coil 5 and the lengths of the loop sections 27a, 27b are matched with one another such that the first deposition burner 4b on the one deposition path 28b follows the last deposition burner 4a on the other deposition path 28a at a distance of 10 cm. The length of the burner coil 5 is half the length of the path of movement 6 less a burner-to-burner distance of 10 cm, which is 170 cm in this specific case. The deposition path 28b and the deposition path 28a are traveled through by the deposition burners 4 in the same direction (from the right to the left), as outlined by directional arrows 10. The crossing point 21 is within a region outside the deposition paths 28a, 28b. The crossing point 21 at which the loop sections 27a and 27b cross each other is constructed as a simple rail crossing.

$SiCl_4$, hydrogen and oxygen are supplied to each of the deposition burners 4 via separate medium supply lines 9. The medium supply lines 9 arriving from below extend in the view of FIG. 2 in a direction perpendicular to the sheet plane. They are made from flexible tubes of PFA.

The method of the invention shall now be explained in more detail with reference to an example and with reference to FIG. 2:

For producing an $SiO_2$ soot body 3 the deposition burners 4 are fed with nominally identical amounts of the media in the form of $SiCl_4$, oxygen and hydrogen, and each of these amounts is converted in a burner flame (whose direction of propagation in the illustration of FIG. 2 extends in a direction perpendicular to the sheet plane towards the soot body 3) into $SiO_2$ particles. When traveling through the deposition paths 28a; 28b, the burner flames are directed onto the carrier 1 or the surface 11 of the soot body 3 already formed thereon, so that $SiO_2$ particles are deposited in layers by means of the deposition burners 4 on the carrier 1 with formation of the porous $SiO_2$ soot body 3. During travel through the loop sections 27a; 27b outside the deposition paths 28a; 28b, the $SiCl_4$ supply to the deposition burners 4 is stopped. Those deposition burners that are not fed with $SiCl_4$ at the moment are provided with a brighter hatching.

The burner coil 5 is moved in a repeating movement sequence without reversal of the direction of movement along the path of movement 6. The movement sequence is symbolized by the directional arrows 10. In the embodiment, the following movement sequence is obtained:

The burner coil 4 is given a left-hand twisting of minus 180 degrees before start of the first travel. Starting at the right end of the soot body 3, it travels through the deposition path 28a and through the loop section 27a wound to the right side, with the result that the preliminary twisting of the medium supply lines 9 is compensated, it then crosses the crossing point 21 and subsequently travels through the deposition path 28b with a right-hand twisting of 180 degrees. The deposition path 28b extends, offset by about 4 cm, in parallel with the deposition path 28a along the carrier 1. From the deposition path 28b the burner coil 5 passes over the loop section 27b, which is wound to the left side by 180 degrees, back to the crossing point 21, with the result that the twisting of the medium supply lines 9 is offset at the crossing point 21, and it is again given the initial left-hand twisting of minus 180 degrees when passing onto the deposition path 28a. This permits a continuous movement sequence of the burner coil 5 without reversal of the direction of movement and without cooling of the soot body 3, the medium supply lines 9 being twisted by not more than 180 degrees to the left side and to the right side.

Each of the deposition paths 28a and 28b extends laterally offset by about 2 cm relative to the longitudinal axis 2, as is schematically outlined in FIG. 3. The figure is a view showing the device of FIG. 2 in the direction of the longitudinal axis of the carrier and in a projection of the two deposition burners 4a and 4b, which are arranged one after the other on different deposition paths 28a and 28b in longitudinal axis direction, onto a joint plane (sheet plane). The distance of 2 cm, based on the vertical 24 (central axis), refers to the minimum distance of the opposite rails 14 from each other. When traveling through the deposition paths 28a and 28b, respectively, the deposition burners are here inclined relative to the vertical 24, as is also shown in FIG. 3. The inclination of the deposition burners 4 is here adjusted such that the extension of the main propagation direction 23 of the burner flames 26 intersects the longitudinal axis 2. The rail 14 comprises two metal rods extending in parallel with one another and along the path of movement 6. The mounting and guidance of the deposition burners 4a, 4b on the rail 14 consists of an inner part 15, to which the quartz glass deposition burners 4 are firmly fixed, and of an outer part 16 which has a receiving means into which the inner part 15 projects and in which it is rotatably supported axially (about the main propagation direction 23), as outlined by rotational arrow 18. The outer part 16 simultaneously serves to guide the deposition burner 4a, 4b on the rail 14. Thanks to the rotational support of all deposition burners 4, the torsion of the individual medium supply lines 9 relative to the deposition burners 4 is reduced during travel through the path of movement 6.

The method of the invention permits a homogeneous deposition of the $SiO_2$ particles at a high deposition rate and without constructionally complicated rotary leadthroughs for the medium supply.

In the embodiment of the device of the invention according to FIG. 4, the deposition burners 4 are guided in a single loop 30. The single loop 30 comprises two deposition paths 31, 21b extending along two soot bodies 3, which are interconnected via curved ends 34. Two oppositely rotating carriers 1 with longitudinal axes 2 arranged in parallel with each other are arranged along the deposition paths 31a, 31b. The single loop 30 defines a horizontally oriented burner plane 32, which in the embodiment corresponds to the plane of the drawing sheet. The length of the burner coil 5 extends over the whole path of movement 6, the distance of neighboring burners being 10 cm.

In the method of the invention, a twisting of the medium supply lines 9 is prevented by a compensating movement in which the medium supply lines 9 are supplied alternatingly once from above the burner plane 32 to the deposition burners 4 and once from below to the burner plane 32. The medium supply lines are here bundled into a medium collection line 33 which branches at a branch point 37 into the individual medium supply lines 9. The alternating movement of the medium collection line 33 can clearly be seen in FIG. 5. As a consequence, the single loop 30 is once traveled through as the first loop 30a with right-hand twisting of the medium supply lines and after the displacement of the medium supply lines 9 the next time as the second loop 30b with left-hand twisting of the medium supply lines 9.

In this procedure the two soot bodies 3 are arranged such that the longitudinal axes 2 of the respective carriers 1 extend in parallel with one another and in the burner plane 32. The soot bodies 3 are acted upon by the deposition burners 4 at the same angle. This is necessary whenever the two soot bodies 3 should have identical characteristics with respect to density and mass without the medium supply being adapted. In the specific embodiment, the deposition burners 4 are directed onto the soot body surface 11 such that the main propagation direction of the burner flames also extends in the burner plane 32, i.e. horizontally. This arrangement of the deposition burners 4 offers the advantages that the deflection of the deposition burners 4 in the area of the two curved ends 34 of the path of movement 6 is just carried out by simply pivoting the deposition burners 4 in the burner plane 32, for which a short distance (narrow radius of curvature) and a correspondingly short period of time for traveling through the ends 34 are needed, so that, as a result, SiO$_2$ is hardly lost, and a heating of the medium supply lines 9 extending above the deposition burners 4 or of the medium collection line 33 is mainly avoided.

A stationary additional burner 38 is provided at each of the two front ends of the soot body 3. With the help of this additional heater 38 the ends of the soot body 3 are consolidated and their mechanical strength is thereby improved.

During displacement of the medium collection line 33, said line is moved in the area of the one of the two curved ends 34 of the path of movement 6 through the opening 35 thereof. In the area of the opposite curved end 34 of the path of movement 6, a collection device 39 is provided for collecting SiO$_2$ particles produced by the deposition burners 4 while changing from the one deposition path to the other, thereby removing said particles from the surroundings of the soot body 3. FIG. 5 shows in detail that the individual medium supply lines 9 are first combined in the middle of the burner assembly 6 to form a medium collection line 33. With a permanent position of the medium collection line 33, said line would be further twisted with each rotation. This is prevented in that the medium collection line 33 is each time passed through a gap 35 in the path of movement 6 from the top to the bottom, and vice versa, when the last deposition burner 4 of the burner coil 5 has passed through the gap 35. The complete sequence of movement thus consists in this case of two travels of the burner coil 5 around the path of movement 6, the medium collection line 3 being guided during the first travel from above through the burner plane 32 and supplied during the second travel from underneath the burner plane 32 to the deposition burners 4.

This variant of the method according to the invention also permits a homogeneous deposition of the SiO$_2$ particles at a high deposition rate, and constructionally complicated rotary leadthroughs for the medium supply can here be omitted.

The embodiment of the device of the invention according to FIG. 6 shows a modification of the device illustrated in FIGS. 4 and 5. In this modification four carriers 1 are arranged in a square along a closed path of movement 6. The deposition burners 4 of the burner coil 5 travel through the path of movement 6 with a right-hand rotation in the direction illustrated by way of directional arrows 10 and at a burner-to-burner distance of 15 cm, the path of movement 6 comprising four deposition paths 58a, 58b, 58c and 58d. The path of movement 6 is fully occupied by deposition burners 4, the distance between the first deposition burner 4a of the burner coil 5 and the last deposition burner 4b of the burner coil 5 being about 30 cm.

The soot bodies 3 are here arranged such that the longitudinal axes 2 of the respective carriers 1 extend in a joint, horizontally extending burner plane 52. The soot bodies 3 are acted upon from below by the deposition burners 4 in a direction perpendicular to the burner plane 52. This orientation of the deposition burners 4 has the advantage that upon deflection of the deposition burners 4 in the area of the curved portions 51 of the path of movement 6 a change is not needed in the orientation of the deposition burners 4 relative to the burner plane 52.

For the sake of clarity, FIG. 6 only shows some of the individual medium supply lines 9. The medium supply lines 9 are bundled into a medium collection line 37 and branch off in a branch point 37. With a constant linear guidance of the medium supply lines 9, these would get further twisted with each travel of the burner coil 6. This is avoided according to the invention in that each time when the last deposition burner 4b has passed through a gap 35 in the path of movement 6, the medium supply line 33 is shifted and thereby guided through the gap 35, as illustrated by directional arrow 35, so that the medium supply lines 9 are guided once from underneath the burner plane 52 and once from above through the burner plane 52 towards the deposition burners 4, each displacement of the medium supply lines causing a reversal of the twisting. Hence, in this case, too, the complete movement sequence consists of two circulations of the burner coil 5 around the path of movement 6, the medium collection line 33 being guided during the first circulation from above through the burner plane 32, and during the second circulation from underneath the burner plane 32 to the deposition burners 4.

This variant of the method according to the invention also permits a homogeneous deposition of SiO$_2$ particles at a high deposition rate, and constructionally complicated rotary leadthroughs for the medium supply can be omitted.

The invention claimed is:

1. A method for producing a cylindrical body using a deposition assembly having a plurality of serially-arranged depositors to which a starting substance is fed via medium supply lines, said method comprising: depositing particles in layers on an outer surface of a carrier rotating about a longitudinal axis thereof to form the cylindrical body, wherein the deposition assembly travels through a closed path of movement in a predetermined movement sequence, said path of movement comprising at least one deposition path extending along the longitudinal axis of the carrier, wherein the path of movement comprises a first loop and a second loop, the deposition assembly, when traveling through the first loop causing a right-hand twisting of the medium supply lines, and when travelling through the second loop causing a left-hand twisting of the medium supply lines.

2. The method according to claim 1, wherein neighboring depositors of the deposition assembly are maintained at a predetermined distance that is in a range of 5 cm to 50 cm from one another, and wherein during travel through the deposition path a first depositor of the deposition assembly follows a last depositor thereof at a distance within the range of the predetermined distance.

3. The method according to claim 1 wherein particles deposited by the depositors outside the deposition path are collected by means of a collection device.

4. The method according to claim 1, wherein the first loop is traveled through in a predetermined direction of rotation, and the second loop in an opposite direction of rotation.

5. The method according to claim 4, wherein the first loop and the second loop have a joint path of deposition.

6. The method according to claim 4, wherein the loops have a crossing point in common and each has at least one path of deposition.

7. The method according to claim 1, wherein the depositors are operated in a deposition mode so as to cause deposition of particles on the outer cylindrical surface of the carrier during travel through the deposition path and in an idle mode without deposition of particles.

8. The method according to claim 7, wherein not more than 50% of the depositors of the deposition assembly are simultaneously operated in the deposition mode.

9. The method according to claim 1, wherein the path of movement comprises a single loop which is traveled through by the deposition assembly at least once as the first loop and at least once as the second loop in the same direction of rotation, the medium supply lines, or a medium collection line branching into the medium supply lines, being displaced in the movement sequence such that during travel through the first loop a right-hand twisting of the medium supply lines or the medium collection line is produced and during travel through the second loop a left-hand twisting of the medium supply lines or the medium collection line is produced.

10. The method according to claim 9, wherein the medium supply lines are bundled into a medium collection line which branches at a branch point into the medium supply lines connected to the depositors.

11. The method according to claim 9, wherein the medium supply lines or the medium collection line are displaced by a guiding thereof through the path of movement.

12. The method according to claim 9, wherein the depositors of the deposition assembly are distributed throughout the single loop.

13. The method according to claim 9, wherein the medium supply lines or the medium collection line are alternately displaced after having traveled once through the first loop and once through the second loop, respectively.

14. The method according to claim 9, wherein before each travel through the path of movement the medium supply lines have a pre-twisting with a twisting direction opposite to the twisting during subsequent travel through the path of movement.

15. The method according to claim 9, wherein at least one further carrier rotating about a respective longitudinal axis thereof is provided along the path of movement, and that the path of movement comprises, extending along each further carrier, a respective deposition path.

16. The method according to claim 15, wherein the longitudinal axes of the carriers extend in parallel with each other.

17. The method according to claim 9, wherein each of the depositors has assigned thereto a main deposition direction which extends inclined by not more than 30 degrees relative to a plane formed by the carrier.

18. A device for producing a cylindrical body, said device comprising a deposition assembly having a plurality of serially disposed depositors which are connected to medium supply lines supplying a starting substance, and which is movable over a closed path of movement including at least one path of deposition extending along a carrier which is supported to be rotatable about a longitudinal axis thereof, wherein the path of movement comprises a first loop causing a right-hand twisting of the medium supply lines, and a second loop causing a left-hand twisting of the medium supply lines.

19. The device according to claim 18, wherein neighboring depositors of the deposition assembly are maintained at a predetermined distance in a range of 5 cm to 50 cm from one another, and the deposition assembly and the path of movement have lengths related to one another such that during travel through the deposition path a first depositor of the deposition assembly follows a last depositor at a distance within the range of the predetermined distance.

20. The device according to claim 18, wherein the first loop is traveled through in a predetermined direction of rotation, and the second loop in an opposite direction of rotation.

21. The device according to claim 20, wherein the first loop and the second loop have a joint path of deposition.

22. The device according to claim 20, wherein the loops have a crossing point in common and each has at least one path of deposition.

23. The device according to claim 18, wherein the first loop and the second loop have equal lengths.

24. The device according to claim 18, wherein the path of movement comprises a closed single loop which is traveled through by the burner assembly at least once as the first loop and at least once as the second loop in the same direction of rotation, and further having a structure displacing the medium supply lines or a medium collection line branching into the medium supply lines in such a manner that the medium supply lines or the medium collection line extend to the deposition burners during a movement sequence, alternatingly arriving from one side of the closed single loop and from the opposite side of the single loop.

25. The device according to claim 24, wherein the medium supply lines or the medium collection line can be displaced through the path of movement.

26. The device according to claim 24, wherein the medium supply lines (9) are bundled into a medium collection line (33) which branches at a branch point (37) into the medium supply lines (9) connected to the depositors (4).

27. The device according to claim 24, wherein the depositors of the deposition assembly are distributed throughout the single loop.

28. The device according to claim 18, wherein at least one further carrier rotating about a respective longitudinal axis thereof is provided along the path of movement, and that the path of movement comprises, extending along each further carrier, a respective deposition path.

29. The device according to claim 28, wherein the longitudinal axes of the carriers extend in parallel with one another.

30. The device according to claim 29, wherein a distance of the longitudinal axes of the carriers opposite to one another along the path of movement can be adjusted.

31. The device according to claim 18, wherein stationary additional heaters are provided in areas adjacent ends of the cylindrical body.

32. The device according to claim 18, wherein each of the depositors has a central axis and that each of the depositors is rotatably supported about the central axis in a mount connected to the path of movement.

* * * * *